United States Patent [19]
Ito et al.

[11] Patent Number: 5,715,997
[45] Date of Patent: Feb. 10, 1998

[54] AIR TEMPERATURE CONTROL APPARATUS FOR VEHICLE USE

[75] Inventors: Yuji Ito, Ichinomiya; Takayosi Kawai, Hoi-gun; Tatsumi Kumada, Oobu; Makoto Umebayashi, Chiryu; Susumu Wakuda, Kariya, all of Japan

[73] Assignee: Denso Corporation, Kariya, Japan

[21] Appl. No.: 783,678

[22] Filed: Jan. 15, 1997

[30] Foreign Application Priority Data

Jan. 16, 1996 [JP] Japan ................. 8-004968

[51] Int. Cl.$^6$ ........................................ F24D 3/00
[52] U.S. Cl. ............... 236/1 B; 236/49.3; 165/43; 165/203
[58] Field of Search ............... 236/49.3, 1 B, 236/91 E; 165/203, 42, 43; 62/244

[56] References Cited

U.S. PATENT DOCUMENTS

| | | | |
|---|---|---|---|
| 4,665,971 | 5/1987 | Sakurai | 165/203 |
| 4,711,295 | 12/1987 | Sakurai | 236/49.3 |
| 4,800,951 | 1/1989 | Sakurai | 236/49.3 |
| 5,086,628 | 2/1992 | Hashimoto | 236/49.3 |
| 5,181,553 | 1/1993 | Doi | 165/203 |
| 5,582,234 | 12/1996 | Samukawa et al. | 236/49.3 |
| 5,642,856 | 7/1997 | Samukawa et al. | 236/1 B |

FOREIGN PATENT DOCUMENTS

A-7-172139  7/1995  Japan.

*Primary Examiner*—William E. Tapolcai
*Attorney, Agent, or Firm*—Harness, Dickey & Pierce, PLC

[57] ABSTRACT

To enable performance of comfortable rear seat air temperature control when an air temperature control system is changed from a state where solely a front seat air temperature control unit is operating to a state where a rear seat air temperature control unit also is operating, when deviation between temperature Tr(Fr) detected by a front seat inner air temperature sensor and a temperature Tr(Rr) detected by a rear seat inner air temperature sensor is a predetermined temperature A or more, a temperature Tr'(Rr) used in calculating a rear seat target blowing temperature is taken to be Tr(Fr)—B'. Additionally, when the above-mentioned deviation is A or less, Tr'(Rr) is taken to be equal to Tr(Rr). Due to this, Tr'(Rr) gradually rises and moreover, this Tr'(Rr) is a temperature more closely approaching a rear seat mean temperature, and so by controlling a rear seat air temperature control unit based on the rear seat target blowing temperature calculated based on this Tr'(Rr), problems such as variations in air quantity and hunting of a vent mode can be prevented, and comfortable rear seat air temperature control can be performed.

10 Claims, 11 Drawing Sheets

AIR TEMPERATURE CONTROL APPARATUS FOR VEHICLE USE

CROSS-REFERENCE TO RELATED APPLICATION

The present application is related to and claims priority from Japanese Patent Application No. Hei 8-4968, incorporated herein by reference.

BACKGROUND OF THE INVENTION

1. Field of the Invention

This invention relates to an air temperature control apparatus for vehicle use which can independently control temperature of a first air temperature control zone and a second air temperature control zone within a passenger compartment.

2. Description of Related Art

An air temperature control apparatus for vehicle use is known from the prior art which provides a front seat temperature setting device, a front seat inner air temperature sensor, and a front seat air temperature control unit on a front seat-side within a passenger compartment; provides a rear seat temperature setting device, a rear seat inner air temperature sensor, and a rear seat air temperature control unit on a rear seat side; controls the front seat air temperature control unit based on a deviation between a front seat temperature established by the front seat temperature setting device and a front seat temperature detected by the front seat inner air temperature sensor; and together with this, controls the rear seat air temperature control unit based on a deviation between a rear seat temperature established by the rear seat temperature setting device and a rear seat temperature detected by the rear seat inner air temperature sensor.

In such an air temperature control apparatus for vehicle use, ordinarily the rear seat air temperature control unit operates solely in an inner air recirculating mode where inner air taken in from a rear seat inner air intake port opening within the passenger compartment is again blown into the interior of the passenger compartment. Consequently, an air current is constantly generated at the foregoing rear seat inner air intake port during operation of the rear seat air temperature control unit, and so in many cases the rear seat inner air temperature sensor is disposed in the vicinity of this rear seat inner air intake port.

However, when conversely the rear seat air temperature control unit is stopped, substantially no air current strikes the rear seat inner air temperature sensor. For this reason, a first problem such as will be described hereinafter occurs when switched from a state where the front seat air temperature control unit is operating and the rear seat air temperature control unit has been stopped to a state where the rear seat air temperature control unit also is operating.

When the front seat air temperature control unit alone is started in a state where the interior of the passenger compartment has been sufficiently chilled, for example, during winter, the front seat air temperature control unit blows warm air based on a deviation between the front seat established temperature and the front seat detected temperature, and so the front seat mean temperature gradually rises, as shown by the solid line in FIG. 18.

Herein, because no partitioning member is provided between the front seat space and the rear seat space, the rear seat mean temperature gradually rises along with the increase in the front seat mean temperature, as shown by the broken line in FIG. 18, irrespective of the rear seat air temperature control unit being stopped.

However, because no air current strikes the rear seat inner air temperature sensor while the rear seat air temperature control unit is stopped, as was described above, the above-mentioned rear seat detected temperature rises only at an extremely slow speed, as shown by the single-dotted line in FIG. 18. As a result of this, the foregoing rear seat detected temperature becomes a temperature which is considerably lower than the actual rear seat mean temperature.

When the rear seat air temperature control unit also is started while in such a state, the rear seat air temperature control unit blows warm air based on a deviation between the rear seat established temperature and the rear seat detected temperature which is considerably lower than the actual rear seat mean temperature, and so a large quantity of air or high-temperature air unanticipated by the rider is blown toward the rear seat.

The above-described first problem similarly occurs also in a case of cooling the interior of the passenger compartment during summer. That is, a large quantity of air or low-temperature air unanticipated by the rider is blown toward the rear seat when switched from a state where solely the front seat is caused to be operating to a state where the rear seat air temperature control unit also is operating.

In this regard, the apparatus disclosed in Japanese Patent Application Laid-open No. 7-172139 exists as art to solve the above-mentioned first problem. When the rear seat air temperature control unit is stopped, this considers a rear seat inner air temperature used for control of the rear seat air temperature control unit to be the above-described front seat detected temperature (substantially equal to the front seat mean temperature), and when starting the rear seat air temperature control unit, this causes the above-described rear seat inner air temperature for control use to be gradually changed in value from the foregoing front seat detected temperature to the foregoing rear seat detected temperature.

Although this system definitely does suppress the above-mentioned first problem, a second, different problem occurs. This second problem will be described hereinafter with reference to FIG. 19.

When the front seat air temperature control unit alone is started in a state where the interior of the passenger compartment has been sufficiently chilled, for example, during winter, the front seat mean temperature, the rear seat mean temperature, and the rear seat detected temperature change as shown respectively by the solid line, the broken line, and the single-dotted line in FIG. 19. Additionally, because the above-described rear seat inner air temperature for control use becomes the front seat detected temperature (substantially equal to the front seat mean temperature), the rear seat inner air temperature for control use changes as shown by the double-dotted line in FIG. 19.

Accordingly, when the rear seat air temperature control unit is started while in this state, the above-mentioned rear seat inner air temperature for control use becomes a temperature higher than the rear seat detected temperature, as shown by point X in FIG. 19. Thereafter, the rear seat inner air temperature for control use changes gradually toward the above-described rear seat detected temperature, and so the rear seat inner air temperature for control use gradually declines and becomes the rear seat detected temperature at point Y in FIG. 19, and gradually rises from this point Y.

Because the foregoing rear seat inner air temperature for control use declines once and thereafter again rises subsequently to starting of the rear seat air temperature control unit, hunting of a rear seat vent mode occurs in a case where a rear seat blown-air temperature rises or falls once, or where a rear seat vent mode is determined based on the foregoing rear seat inner air temperature for control use, such that the rear seat vent mode which was a bilevel mode (B/L) during starting of the rear seat air temperature control unit changes to a foot mode (FOOT) in accompaniment with the decline in the rear seat inner air temperature for control use, and thereafter the rear seat inner air temperature for control use again rises and the rear seat vent mode again returns to the bilevel mode in accompaniment thereto.

Moreover, the above-described second problem similarly occurs also when cooling the interior of the passenger compartment during summer. That is, a problem occurs in that when switched from a state where solely the front seat air temperature control unit is operated to a state where the rear seat air temperature control unit also is operated, the temperature of air blown toward the rear seat drops or rises once, or the rear seat vent mode which was the bilevel mode when the rear seat air temperature control unit was started thereafter becomes a face mode and again returns to the bilevel mode.

SUMMARY OF THE INVENTION

In this regard, it is an object of the present invention to simultaneously solve the foregoing first and second problems.

According to a first aspect of the present invention, when subsequent to having been switched from a state where the first air temperature control unit is operating and the second air temperature control unit has stopped to a state where this second air temperature control also is operating, deviation between the first detected temperature detected by the first inner air temperature-detecting device and the second detected temperature detected by the second inner air temperature detecting device is a predetermined temperature or more, the second target temperature is calculated using a temperature separated by substantially the predetermined temperature from the first detected temperature in place of the second detected temperature, and when the deviation is the predetermined temperature or less, the second target temperature is calculated using substantially the second detected temperature. Consequently, when the second inner air temperature detecting device has been disposed at a location where the mean temperature of the second air temperature control zone can constantly be detected, the above-mentioned deviation between the first detected temperature and the second detected temperature should come to be within the above-described predetermined temperature.

However, when the second inner air temperature-detecting device has been disposed at a location where an air current of the second air temperature control zone strikes in conjunction with operation of the second air temperature control unit, as in this invention, the foregoing deviation may become the above-described predetermined temperature or more, as shown by the double-dotted lines in FIG. 18 and FIG. 19. At this time, when the second target temperature is calculated using the second detected temperature and the second air temperature control unit is controlled based on this second target temperature, airflow of a quantity and of a temperature unanticipated by the rider is blown into the second air temperature control zone.

According to this invention, the second target temperature is calculated using a temperature separated by substantially the predetermined temperature from the first detected temperature in place of the second detected temperature when the above-described deviation is the foregoing predetermined temperature or more, and so the second target temperature can be calculated based on a temperature proximate to the actual mean temperature of the second air temperature control zone, at least in comparison with a case where the second target temperature is calculated using unchanged the second detected temperature, and the first problem which was described with reference to FIG. 18 can be solved.

Additionally, when the above-described deviation becomes the above-mentioned predetermined temperature or less, the second detected temperature can be considered to be a temperature proximate to the actual mean temperature of the second air temperature control zone, and so the second target temperature is calculated at this time using substantially the second detected temperature. Consequently, the second target temperature can be calculated based on a temperature proximate to the actual mean temperature of the second air temperature control zone, and the above-described first problem can be solved.

The temperature separated from the first detected temperature by substantially the predetermined temperature signifies both a temperature separated from the first detected temperature by exactly the predetermined temperature and a temperature which differs somewhat with respect to this temperature. Additionally, "substantially the second detected temperature" signifies both exactly the second detected temperature and a temperature differing somewhat with respect to this second detected temperature.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

First, the discoveries which led the inventors to the present invention will be described. The inventors conducted experimentation which will be described hereinafter when outside air temperature was −10° C. and when outside air temperature was 30° C.

First, a front seat inner air temperature sensor for experimental use was provided in the front seat space at a location where the above-described front seat mean temperature could constantly be detected irrespective of whether the front seat air temperature control unit is operating or stopped. Additionally, a rear seat inner air temperature sensor for experimental use was provided in the rear seat space at a location where the above-described rear seat mean temperature could constantly be detected irrespective of whether the rear seat air temperature control unit is operating or stopped.

Accordingly, after the vehicle was allowed to rest for a prolonged period until the passenger compartment temperature became substantially equal to the outside air temperature, the front seat established temperature was established at 25° C. and the front seat air temperature control unit alone was started.

Figure 18:
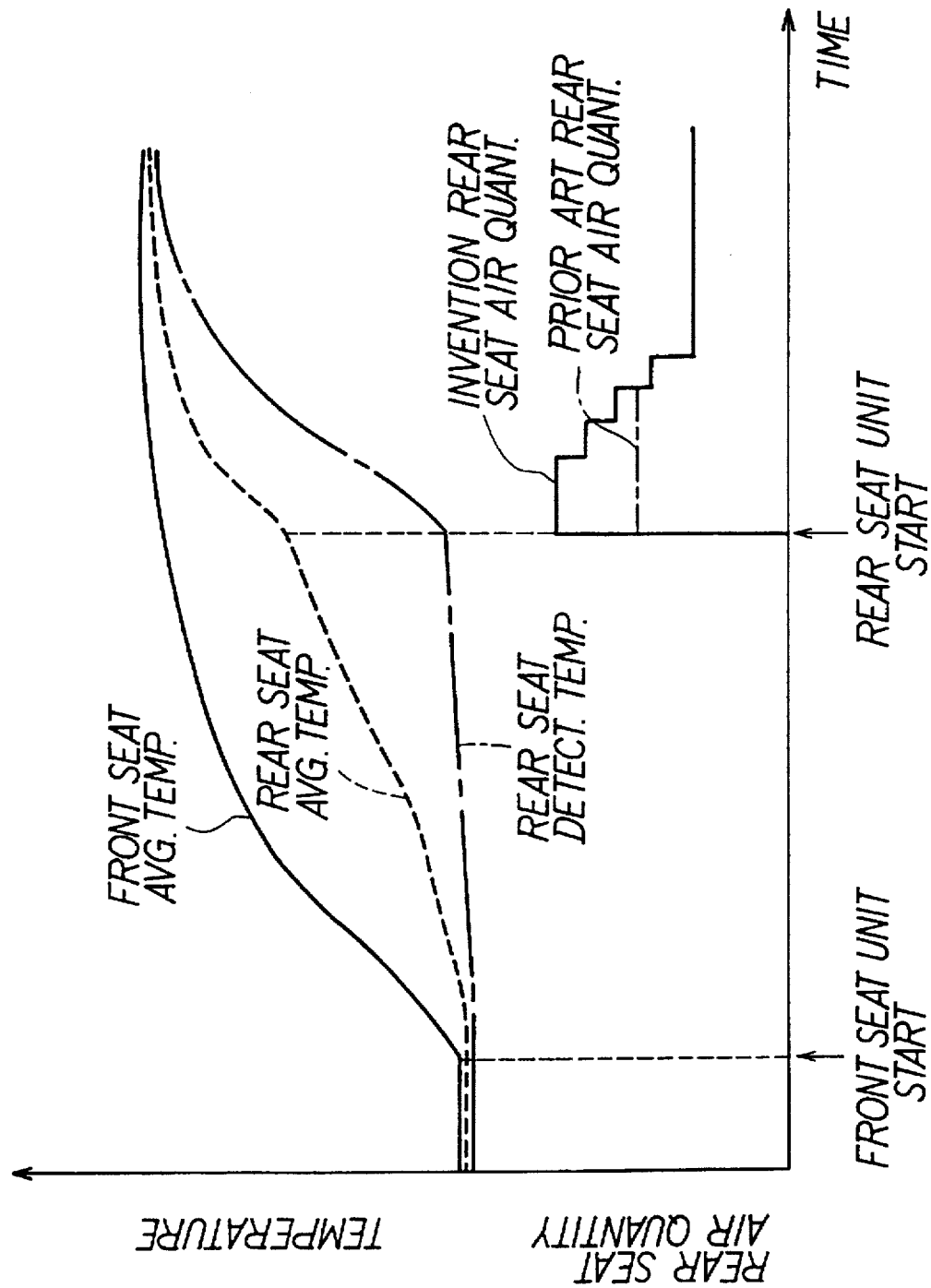
FIG. 18 shows temporal change of several temperatures according to a prior art system.
Figure 19:
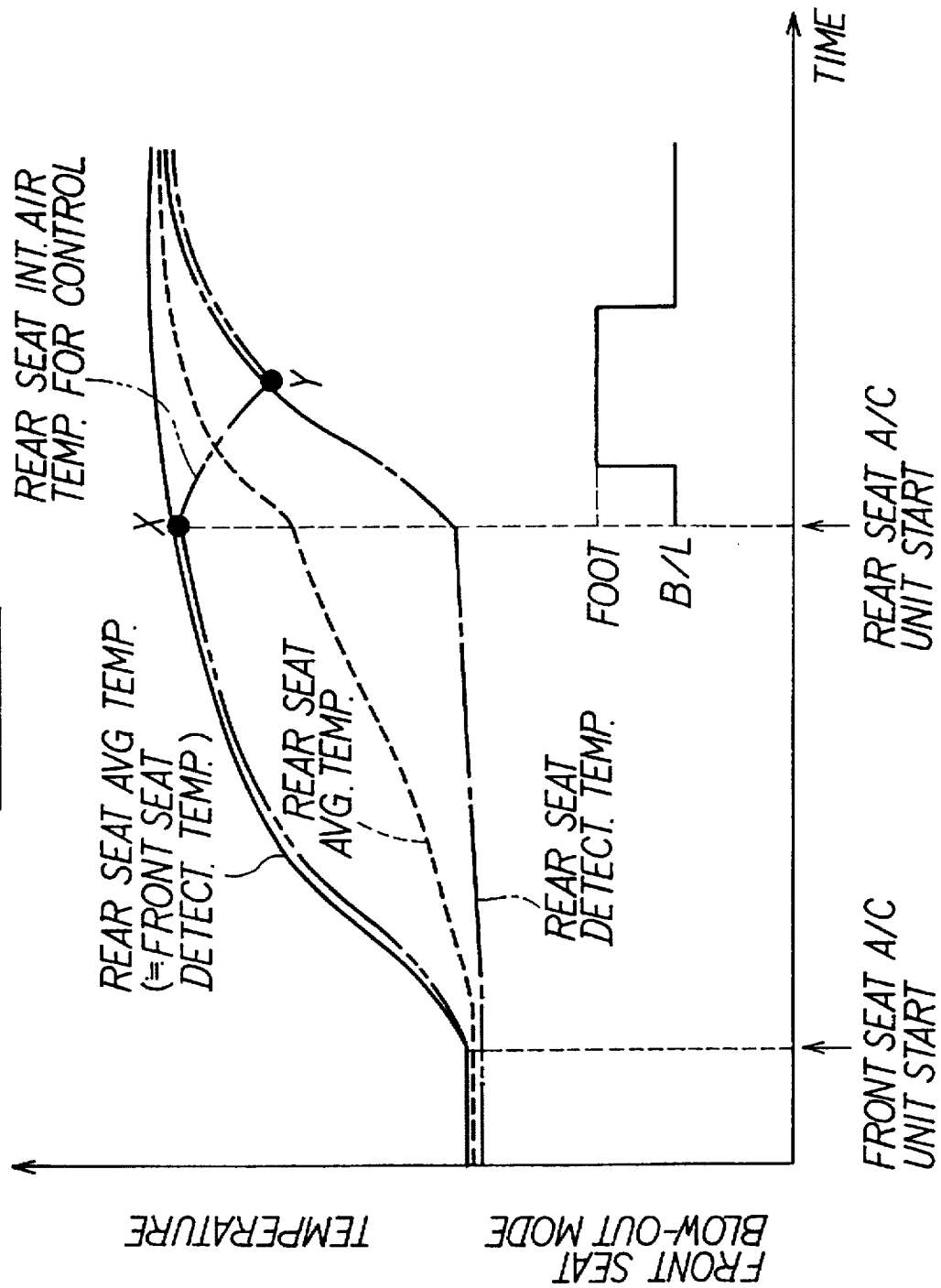
FIG. 19 shows temporal change of several temperatures according to the prior art.

As a result thereof, the front seat mean temperature detected by the front seat inner air temperature sensor for experimental use gradually rose toward 25° C. when the outside air temperature was −10° C. and gradually fell toward 25° C. when the outside air temperature was 30° C., as shown by the solid lines in FIG. 18 and FIG. 19.

Additionally, the rear seat mean temperature detected by the rear seat inner air temperature sensor for experimental use gradually rose more slowly than the rise in the front seat temperature when the outside air temperature was −10° C. and gradually fell more slowly than the decline in the front seat temperature when the outside air temperature was 30° C., as shown by the broken lines in FIG. 18 and FIG. 19.

The discrepancy between the above-mentioned front seat mean temperature and rear seat mean temperature gradually became larger after starting the front seat air temperature control unit, but differed by about 10° C. at the most whether the outside air temperature was −10° C. or 30° C. Accordingly, the foregoing divergence thereafter gradually became smaller and ultimately converged at approximately 6° C.

The maximum value and the convergence value of the discrepancy were 10° C. and 6° C. in a case of the above-described experimentation, but these values may vary somewhat when the configuration or the like of the vehicle is changed. However, it was understood that the maximum value and the convergence value of the foregoing discrepancy are about 10° C. and 6° C.) at the most in either case.

(First Embodiment)

A first preferred embodiment of the present invention which is preferably used as an air temperature control apparatus in a van will be described with reference to FIGS. 1–12.

Figure 1:
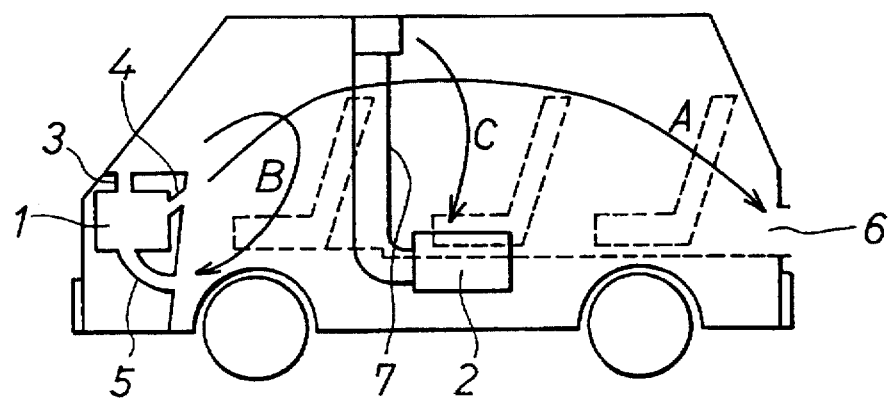
FIG. 1 is a diagram showing installation locations within a vehicle of several air temperature control units according to a first preferred embodiment of the present invention.

As shown in FIG. 1, a front seat air temperature control unit 1 is provided on a front seat side within a passenger compartment as a first air temperature control unit to heat and cool a front seat space which is a first air temperature control zone, and a rear seat air temperature control unit 2 is provided on a rear seat side within the passenger compartment as a second air temperature control unit to heat and cool a rear seat space which is a second air temperature control zone.

The foregoing front seat air temperature control unit 1 is disposed below a passenger compartment instrument panel provided on the front seat side, and blows air toward the inner surface of a windshield, the upper body of a front seat rider, and the feet of a front seat rider via a defroster duct 3, a front seat face duct 4, and a front seat foot duct 5, respectively.

Accordingly, when an inner/outer air mode of the front seat air temperature control unit 1 is an outside air inducting mode, blown air from the front seat air temperature control unit 1 passes through the front seat space and the rear seat space and is discharged outside the passenger compartment from a discharge vent 6 opening in a rear package tray (not shown) positioned in a rearmost area of the passenger compartment, as shown by arrow A in FIG. 1.

Figure 2A:
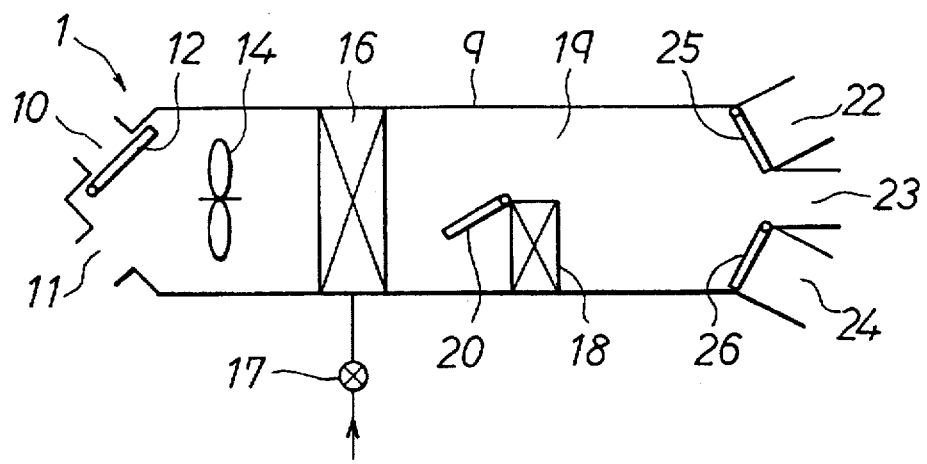
FIG. 2A is a structural view of a front seat air temperature control unit 1 according to the first embodiment.

As shown by arrow B in FIG. 1, when the inner/outer air mode of the front seat air temperature control unit 1 is an inner air recirculating mode, blown air from the front seat air temperature control unit 1 is recirculated in substantially solely the front seat space, taken in from a front seat inner air intake port (not shown) opening in the front seat space, and is again taken into the front seat air temperature control unit 1 via a front seat communicating duct (not shown) connecting this front seat inner air intake port with an inner air intake port 10 (see FIG. 2A).

The above-mentioned rear seat air temperature control unit 2 is provided in a space between a passenger-compartment inner wall and a vehicle outer panel on the rear seat side, and blows chiefly chilled air toward the head of a rear seat rider from the vehicle ceiling via a ceiling duct 7, together with blowing chiefly warmair toward the feet of a rear seat rider via a rear seat foot duct (not shown).

Figure 2B:
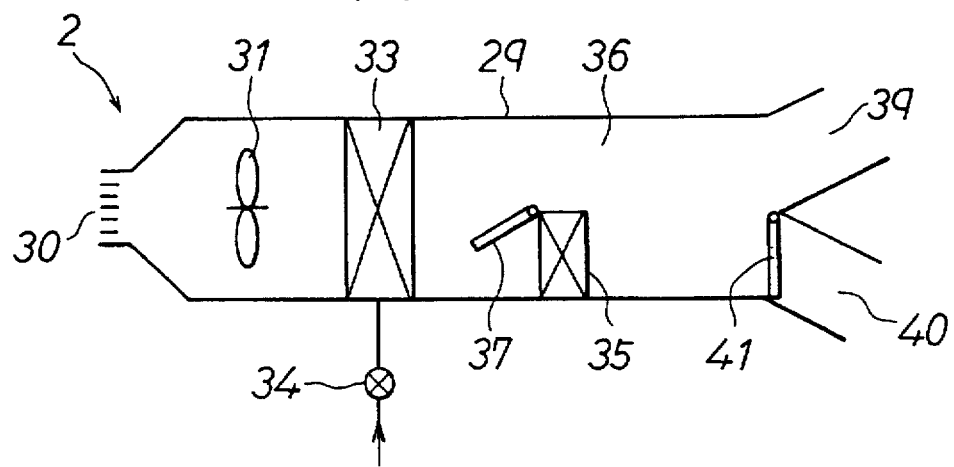
FIG. 2B is a structural view of a rear seat air temperature control unit 2 according to the first embodiment.

This rear seat air temperature control unit 2 is a device for taking in solely inner air and blowing this air within the passenger compartment; for example, as shown by arrow C in FIG. 1, blown air from the ceiling duct 7 is recirculated only in the rear seat space, is taken in from a rear seat inner air intake port (not shown) opening in the rear seat space, and is again taken into the rear seat air temperature control unit 2 via a rear seat communicating duct (not shown) communicating this rear seat inner air intake port with an inner air intake port 30 (see FIG. 2B).

Figure 3:
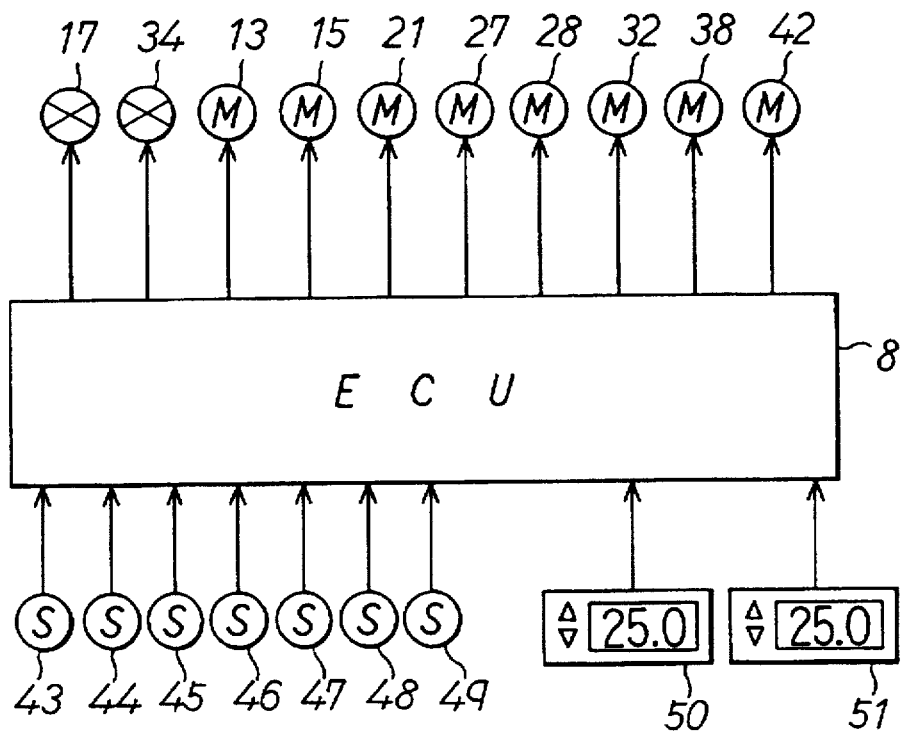
FIG. 3 is a block diagram of a control system according to the first embodiment.

Accordingly, the several air temperature control devices in the above-described units 1 and 2 are respectively independently controlled by an ECU 8 (see FIG. 3).

The structure of the front seat air temperature control unit 1 will be described next with reference to FIG. 2A.

The inner air intake port 10 for taking in air within the passenger compartment and an outside air intake port 11 for taking in outside air are formed on an air upstream-side location of a front seat air-conditioner case 9, and along with this, an inner/outer air-switching door 12 to switch an intake ratio of the inner air and the outside air from these intake ports 10 and 11 is provided. This inner/outer air-switching door 12 is driven by a servomotor 13 (see FIG. 3) as a drive unit thereof.

A fan 14 is disposed as a blowing device on a downstream-side location of the inner/outer air-switching door 12. This fan 14 is driven by a blower motor 15 (see FIG. 3) as a drive unit thereof, and speed of the fan 14, i.e., the amount of air blown into the passenger compartment, is controlled by blower voltage applied to the blower motor 15. This blower voltage is determined by the ECU 8 (see FIG. 3).

A front seat heat exchanger 16 is disposed on a downstream side of the fan 14 as a heat exchanger for cooling use. This front seat heat exchanger 16 is made up of a compressor (not shown) driven by the engine of the automobile and, aside from this, a condenser, pressure-reducing device, and the like (not shown) as well as a refrigeration cycle as known in the art are connected by refrigerant tubing. A solenoid 17 to control refrigerant flow to the front seat heat exchanger 16 is provided in the foregoing refrigerant tubing on a refrigerant upstream side of this front seat heat exchanger 16.

A front seat heater core 18 is provided as a heat exchanger for heating use at an air downstream-side location of the front seat heat exchanger 16. This front seat heater core 18 is a device having engine coolant water flowing in the interior thereof, and which reheats air passing through the front seat heater core 18 with this coolant water as the heat source. Additionally, a bypass passage 19 which causes chilled air from the front seat heat exchanger 16 to bypass the front seat heater core 18 is formed within the front seat air-conditioner case 9.

A front seat air-mix door 20 as a temperature-adjusting device to adjust the proportion of chilled air passing through the front seat heater core 18 and of chilled air passing through the bypass passage 19 is disposed within the front seat air-conditioner case 9. This front seat air-mix door 20 is driven by a servomotor 21 (see FIG. 3) as a drive unit thereof.

A defroster opening 22 to which is connected the defroster duct 3 (FIG. 1), a front seat face opening 23 to which is connected the front seat face duct 4 (FIG. 1), and a front seat foot opening 24 to which is connected the front seat foot duct 5 (FIG. 1) are formed on an air downstream-side location of the front seat air-conditioner case 9.

Accordingly, a defroster door 25 to open or close the defroster opening 22 and a face/foot switching door 26 to selectively open or close the front seat face opening 23 and the front seat foot opening 24 are provided within the front seat air-conditioner case 9. These doors 25 and 26 are driven by servomotors 27 and 28 (see FIG. 3) as drive units thereof.

The structure of the rear seat air temperature control unit 2 will be described next with reference to FIG. 2B.

The inner air intake port 30 opened in the vicinity of a rear seat rider foot area is formed on an air upstream-side location of a rear seat air-conditioner case 29.

A fan 31 is disposed as a blowing device within the rear seat air-conditioner case 29. This fan 31 is driven by a blower motor 32 (see FIG. 3) as a drive unit thereof, and speed of the fan 31 is controlled by blower voltage applied to the blower motor 32. This blower voltage is determined by the ECU 8 (see FIG. 3).

A rear seat heat exchanger for air-chilling use 33 is disposed on a downstream side of the fan 31 as a heat exchanger for air-chilling use. This rear seat heat exchanger 33 makes up the same refrigeration cycle as the above-described front seat heat exchanger 16, and a solenoid 34 to control refrigerant flow to the rear seat heat exchanger 33 is provided in refrigerant tubing on a refrigerant upstream side of this rear seat heat exchanger 33.

A rear seat heater core 35 is provided as a heat exchanger for heating use at an air downstream-side location of the rear seat heat exchanger 33. This rear seat heater core 35 is a device where engine coolant water flows in the interior thereof, and which reheats air passing through the ream seat heater core 35 with this coolant water as the heat source. Additionally, a bypass passage 36 which causes chilled air from the rear seat heat exchanger 33 to bypass the rear seat heater core 35 is formed within the rear seat air-conditioner case 29.

A rear seat air-mix door 37 as a temperature-adjusting device to adjust the proportion of chilled air passing through the rear seat heater core 35 and of chilled air passing through the bypass passage 36 is disposed within the rear seat air-conditioner case 29. This rear seat air-mix door 37 is driven by a servomotor 38 (see FIG. 3) as a drive unit thereof.

A rear seat face opening 39 to which is connected the ceiling duct 7 (FIG. 1) and a rear seat foot opening 40 to which is connected the above-described rear seat foot duct (not shown) are formed on an air downstream-side location of the rear seat air-conditioner case 29.

Accordingly, a face/foot switching door 41 to selectively open or close the rear seat face opening 39 and the rear seat foot opening 40 are provided within the rear seat air-conditioner case 29. This door 41 is driven by a servomotor 42 (see FIG. 3) as a drive unit thereof.

The structure of a control system according to this embodiment will be described next with reference to FIG. 3.

The ECU 8 to control the several air temperature control devices in the above-described several units 1 and 2 is provided with a microprocessor composed of a CPU, ROM, RAM, and the like, as well as a drive circuit to control blower voltage applied to the blower motors 15 and 32, an A/D conversion circuit, and so on. Power from a battery (not shown) is supplied to the ECU 8 when the vehicle's ignition switch has been closed.

Input terminals of the ECU 8 are electrically connected to a front seat inner air temperature sensor 43 as a first inner air temperature-detecting device to detect temperature within the passenger compartment on the front seat side, a rear seat inner air temperature sensor 44 as a second inner air temperature-detecting device to detect temperature within the passenger compartment on the rear seat side, an outside air temperature sensor 46 to detect outside air temperature, a sunlight sensor 46 to detect an amount of sunlight beamed into the passenger compartment, a front seat heat-exchanger temperature sensor 47 to detect air temperature immediately subsequently to passage through the front seat heat exchanger 16, a rear seat heat-exchanger temperature sensor 48 to detect air temperature immediately subsequent to passage through the rear seat heat exchanger 33, a water temperature sensor 49 to detect engine coolant-water temperature, a front seat temperature setting device 50 as a first air temperature control target-establishing device to establish an air temperature control target value for the front seat side, and a rear seat temperature setting device 51 as a second air temperature control target-establishing device to establish an air temperature control target value for the rear seat side.

The foregoing front seat inner air temperature sensor 43 is disposed at a location where mean temperature of the overall front seat space can be detected most favorably, and moreover whereat an air current of the front seat space strikes in conjunction with operation of the front seat air temperature control unit 1. In specific terms, the front seat inner air temperature sensor 43 is disposed at a location proximate to the above-mentioned front seat inner air intake port within the foregoing front seat communicating duct. Consequently, an air current of the front seat space favorably strikes this front seat inner air temperature sensor 43 while the front seat air temperature control unit 1 is operating, and substantially no air current of the front seat space strikes this front seat inner air temperature sensor 43 while the front seat air temperature control unit 1 is stopped.

Additionally, the above-mentioned rear seat inner air temperature sensor 44 is disposed at a location where mean temperature of the overall rear seat space can be detected most favorably, and moreover whereat an air current of the rear seat space strikes in conjunction with operation of the rear seat air temperature control unit 2. In specific terms, the rear seat inner air temperature sensor 44 is disposed at a location proximate to the foregoing rear seat inner air intake port within the foregoing rear seat communicating duct. Consequently, an air current of the rear seat space favorably strikes this rear seat inner air temperature sensor 44 while the rear seat air temperature control unit 2 is operating, and substantially no air current of the rear seat space strikes this rear seat inner air temperature sensor 44 while the rear seat air temperature control unit 2 is stopped.

Signals from the above-described several sensors 43 through 49 undergo A/D conversion by the above-mentioned A/D conversion circuit, and thereafter are input to the foregoing microprocessor.

Output terminals of the ECU 8 are electrically connected to the foregoing solenoids 17 and 34, the foregoing servo-motors 13, 21, 27, 28, 38, and 42, and the and the foregoing blower motors 15 and 32.

The above-described front seat temperature setting device 50 is provided on a front seat air temperature control panel disposed on an instrument panel on the front seat side, and a switch to switch the vent mode, a switch to switch the inner/outer air mode, a switch to regulate the blown-air quantity, an automatic switch to regulate the air temperature control devices of the front seat air temperature control unit 1, and the like (each not shown) are further provided on this front seat air temperature control panel.

The above-described rear seat temperature setting device 51 is provided on a rear seat air temperature control panel disposed on a ceiling unit on the rear seat side, and a switch to regulate the blown-air quantity, an automatic switch to regulate the air temperature control devices of the rear seat air temperature control unit 2, and the like (each not shown) are further provided on this rear seat air temperature control panel.

Control processing of the above-described microprocessor will be described next with reference to FIG. 4.

Figure 4:
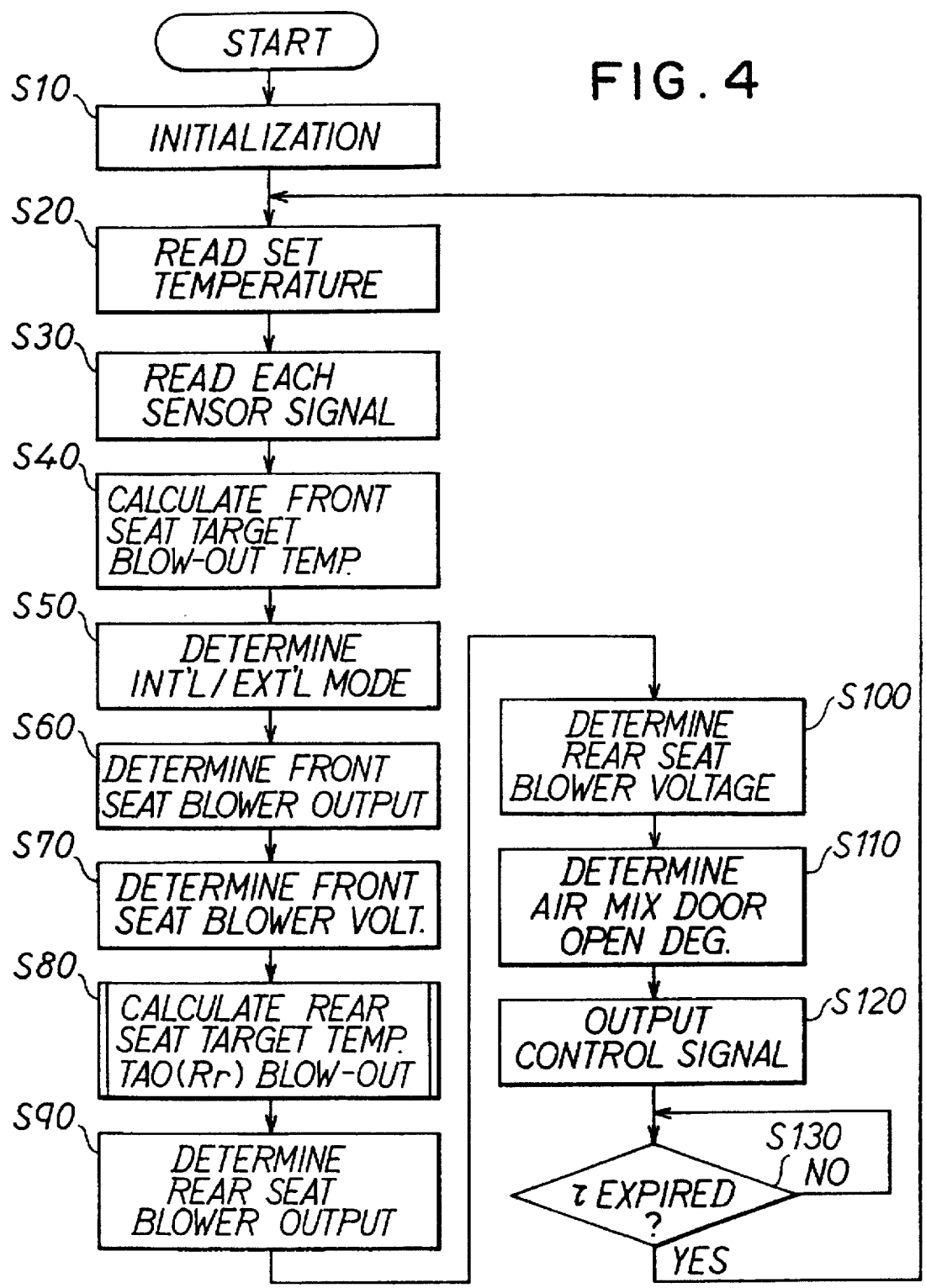
FIG. 4 is a flowchart of processing control by a microprocessor according to the first embodiment.

When the ignition switch is switched on and power is supplied to the ECU 8, the routine in FIG. 4 is started, initialization processing is performed in Step S10, and the established temperatures (Tset(Fr) and Tset(Rr)) set by the above-described several temperature setting devices 50 and 51 are read in the subsequent Step S20.

Accordingly, in the subsequent Step S30, values of the above-mentioned sensors 43 through 49 are read as A/D-converted signals (Tr(Fr), Tr(Rr), Tam, Ts, Te(Fr), Te(Rr), and Tw).

In the subsequent Step S40, front seat target blowing temperature TAO(Fr) as a first target temperature is calculated based on Equation I stored in ROM:

$$TAO(Fr)=Kset(Fr) \cdot Tset(Fr) \cdot Kr(Fr) \cdot Tr(Fr)$$
$$-Kam(Fr) \cdot Tam-Ks(Fr) \cdot Ts+C(Fr) \text{ (°C.)} \quad (1)$$

The foregoing Kset(Fr), Kr(Fr), Kam(Fr), and Ks(Fr) are each a compensating gain, and C(Fr) is a compensation constant.

Figure 5:
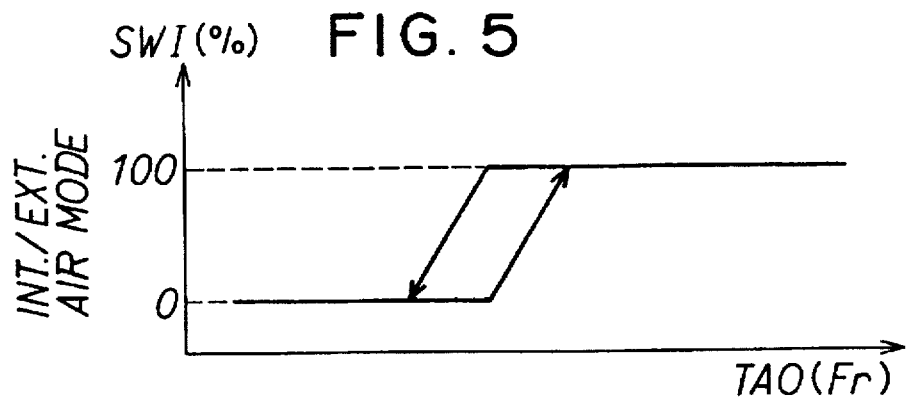
FIG. 5 is a graph showing a target degree of opening SWI of an inner/outer air-switching door according to the embodiment.

In the subsequent Step S50, target opening degree SWI of the inner/outer air-switching door 12 for the inner/outer air mode of the front seat air temperature control unit 1 is calculated based on the foregoing TAO(Fr) and a graph shown in FIG. 5 previously stored in ROM. Herein, SWI=100% signifies a complete outside air inducting mode, and SWI=0% signifies a complete inner air recirculating mode.

Figure 6:
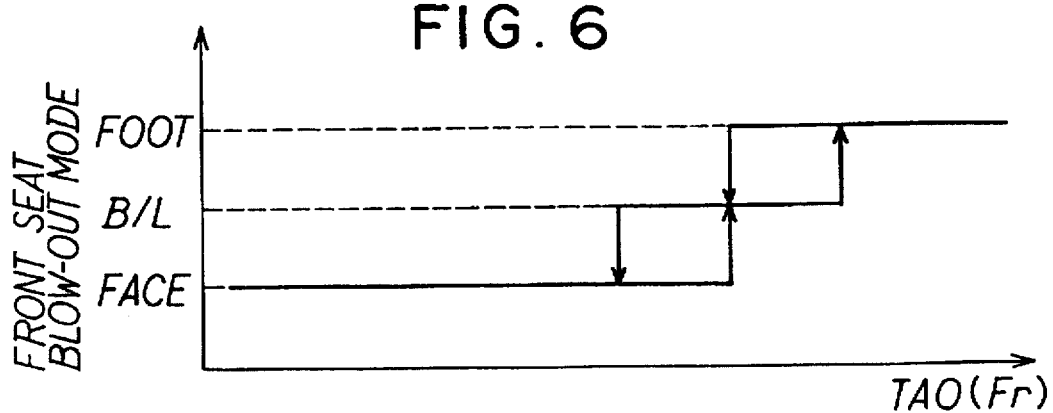
FIG. 6 is a graph showing front seat vent modes according to the first embodiment.

In the subsequent Step S60, the vent mode of the front seat air temperature control unit 1 is determined based on the foregoing TAO(Fr) and a graph shown in FIG. 6 previously stored in ROM.

Here, face mode (FACE) is a mode where air is blown toward the upper body of a front seat rider via the front seat face duct 4 (FIG. 1), bilevel mode (B/L) is a mode where air is blown toward both the upper body and the feet of a front seat rider via the front seat face duct 4 and the front seat foot duct 5 (FIG. 1), and foot mode (FOOT) is a mode where air is blown toward the feet of a front seat rider via the front seat foot duct 5.

Figure 7:
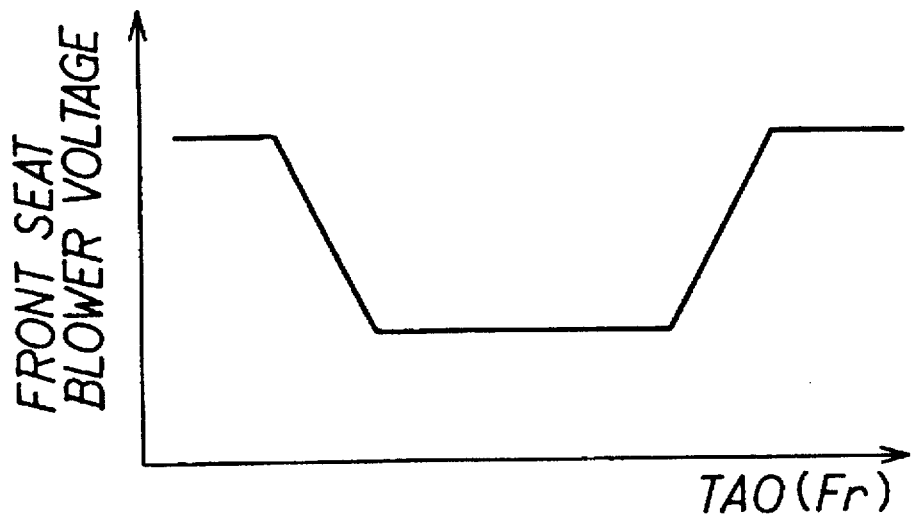
FIG. 7 is a graph showing front seat blower voltage according to the first embodiment.

In the subsequent Step S70, the front seat blower voltage applied to the blower motor 15 of the front seat air temperature control unit 1 is determined based on the above-mentioned TAO(Fr) and a map indicated in FIG. 7 previously stored in ROM.

Figure 8:
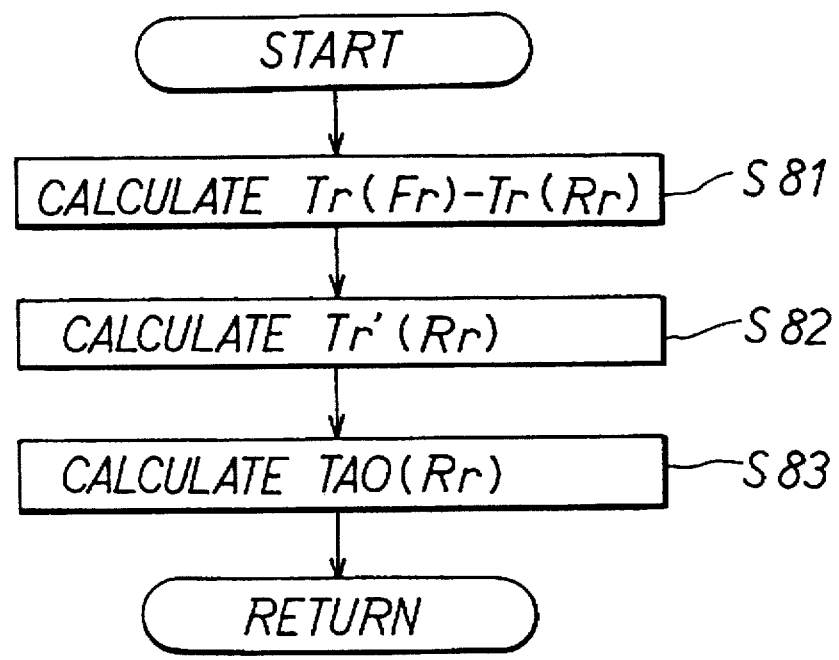
FIG. 8 is a flowchart showing details of Step S80 in FIG. 4.

When execution is transferred to the subsequent Step S80, the subroutine shown in FIG. 8 is called, and a rear seat side target blowing temperature TAO(Rr) is determined. The processing of FIG. 8 will be described hereinafter.

In Step S81, deviation Tr(Fr)—Tr(Rr) of the detected values of the front seat inner air temperature sensor 43 and the rear seat inner air temperature sensor 44 (hereinafter termed "ΔTr") is calculated.

Figure 9:
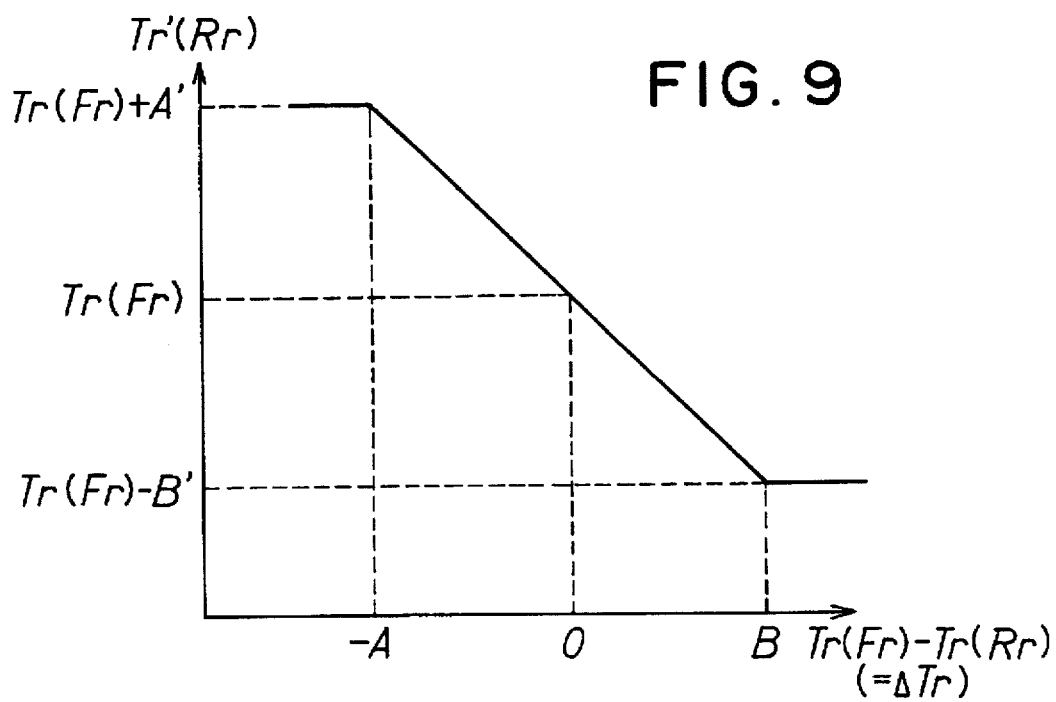
FIG. 9 is a graph showing rear seat inner air temperature Tr'(Rr) subsequently to compensation according to the first embodiment.

Accordingly, in the subsequent Step S82, the inner air temperature Tr(Rr) detected by the rear seat inner air temperature sensor 44 is compensated based on the deviation ΔTr calculated in the foregoing Step S81 and a graph shown in FIG. 9 previously stored in ROM, and inner air temperature Tr'(Rr) used in calculating rear seat target blowing temperature TAO(Rr) is calculated as a second target temperature.

In specific terms, when ΔTr≦−A, calculation is performed so that Tr'(Rr)=Tr(Fr)+A'. When −A≦ΔTr≦B, calculation is performed so that Tr'(Rr) linearly becomes smaller as ΔTr increases. When ΔTr≧B, calculation is performed so as to become constant at Tr'(Rr) Tr(Fr)−B.

That is, according to this embodiment, predetermined temperature is set to A and B, and temperature separated from the first detected temperature by substantially the predetermined temperature is taken to be Tr(Fr)+A' and Tr(Fr)+B'.

Furthermore, A=α+|Tset(Fr)–Tset(Fr)—Tset (Rr)|, A'=α'+ |Tset(Fr)—Tset(Rr)|, B=β+|Tset(Fr)—Tset(Rr)|, and B'=β'+ |Tset(Fr)—Tset(Rr)|.

Additionally, the foregoing α, α', β, and β' each may be determined as a temperature proximate to a maximum value of discrepancy between the front seat mean temperature and the rear seat mean temperature as was described above with reference to FIG. 17, and according to this embodiment, are taken to be α=α'=β=β'=10° C.

In the subsequent Step S83, target blowing temperature TAO(Rr) of the rear seat side as a first target temperature is calculated based on Equation 2 previously stored in ROM, and this subroutine is then exited.

$$TAO(Rr) = Kset(Rr) \cdot Tset(Rr) - Kr(Rr) \cdot Tr'(Rr) - Kam(Rr) \cdot Tam - Ks(Rr) \cdot Ts + C(Rr) \ (°C.) \quad (2)$$

The foregoing Kset(Rr), Kr(Rr), Kam(Rr), and Ks(Rr) are each compensating gain, and C(Rr) is a compensation constant.

Figure 10:
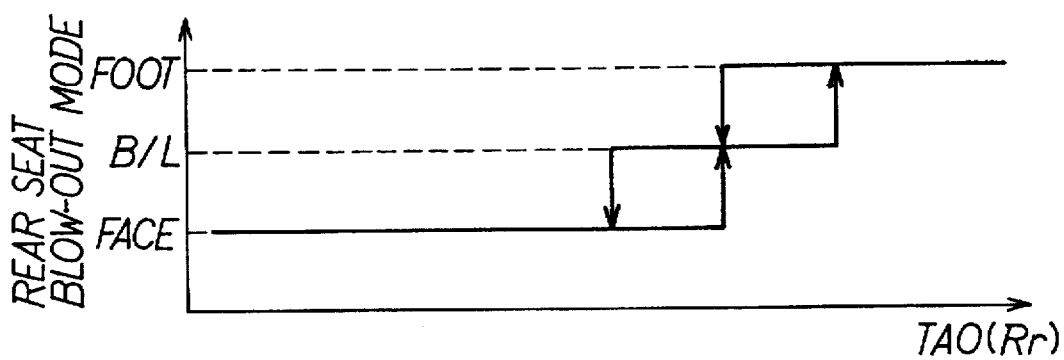
FIG. 10 is a graph showing rear seat vent modes according to the first embodiment.

In the subsequent Step S90 indicated in FIG. 4, the vent mode of the rear seat air temperature control unit 2 is determined based on the above-mentioned TAO(Rr) and a graph shown in FIG. 10 previously stored in ROM.

Herein, face mode (FACE) is a mode where air is blown toward the upper body of a rear seat rider via the ceiling duct 7 (FIG. 1), bilevel mode (B/L) is a mode where air is blown toward both the upper body and the feet of a rear seat rider via the ceiling duct 7 and the rear seat foot duct (not shown), and foot mode (FOOT) is a mode where air is blown toward the feet of a rear seat rider via the above-mentioned rear seat foot duct.

Figure 11:
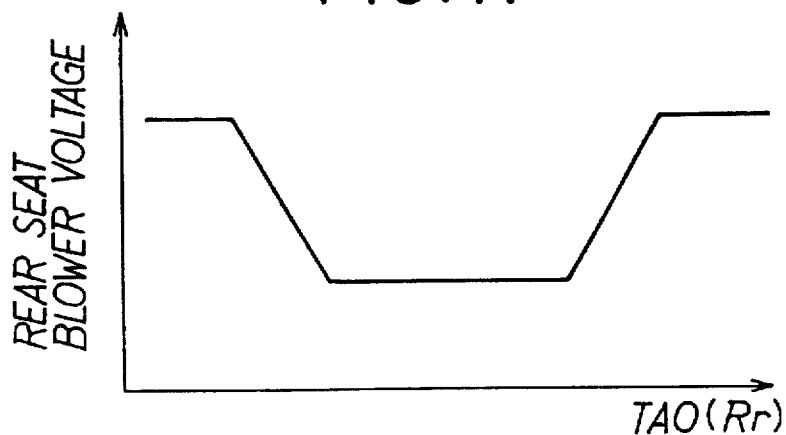
FIG. 11 is a graph showing rear seat blower voltage according to the first embodiment.

In the subsequent Step S100, the rear seat blower voltage applied to the blower motor 32 of the rear seat air temperature control unit 2 is determined based on the foregoing TAO(Rr) and a graph shown in FIG. 11 previously stored in ROM.

In the subsequent Step S110, several target degrees of opening θ(Fr) and θ(Rr) of the air-mix doors 20 and 37 are determined based on Equations 3 and 4 previously stored in ROM:

$$\theta(Fr) = \frac{TAO(Fr) - Te(Fr)}{Tw - Te(Fr)} \cdot 100\% \quad (3)$$

$$\theta(Rr) = \frac{TAO(Rr) - Te(Rr)}{Tw - Te(Rr)} \cdot 100\% \quad (4)$$

In the subsequent Step S120, control signals are output to respective actuators so that the several modes determined in the above-described Steps S50 through S70 and S90 through S110 are obtained.

In the subsequent Step S130, it is determined whether a predetermined control cycle time T has elapsed. If so, execution returns to Step S20; if not, the elapse of the control cycle time τ is awaited.

Figure 12:
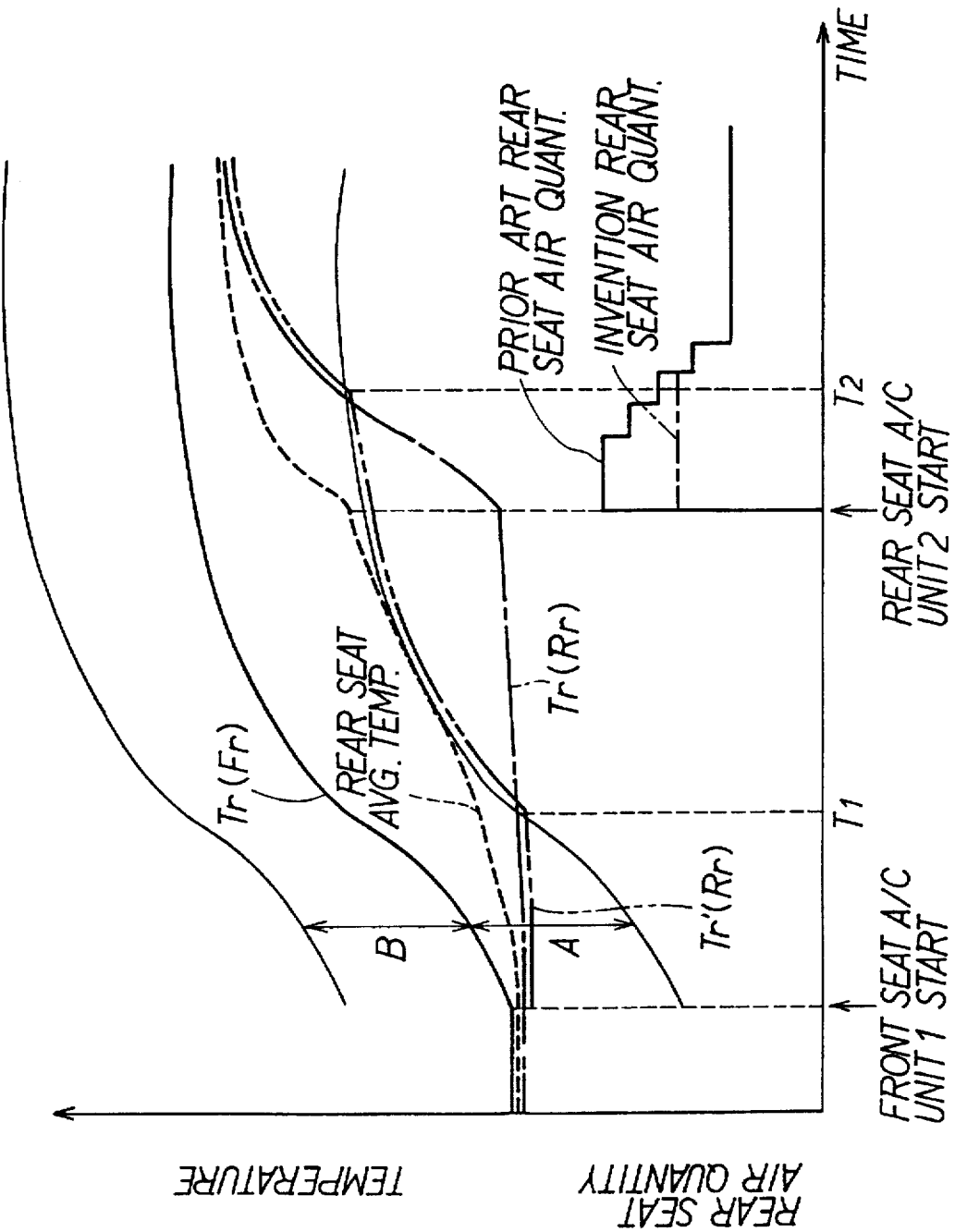
FIG. 12 is a graph showing temporal change in several temperatures according to the first embodiment.

During winter, when the front seat side automatic switch is switched on and solely the front seat air temperature control unit 1 is started while in a state where the interior of the passenger compartment has cooled sufficiently, the front seat detected temperature Tr(Fr) (i.e., the detected value of the front seat inner air temperature sensor 43), the rear seat mean temperature, and the rear seat detected temperature Tr(Rr) (i.e., the detected value of the rear seat inner air temperature sensor 44) change as indicated respectively by the solid line, the broken line, and the single-dotted line in FIG. 12.

Additionally, the rear seat inner air temperature Tr'(Rr) compensated using the graph of FIG. 9 for calculation of the rear seat target blowing temperature TAO(Rr) changes as indicated by the double-dotted line in FIG. 12.

Herein, as is understood from FIG. 12, deviation between Tr(Fr) and Tr(Rr) immediately after the front seat air temperature control unit 1 has been started is smaller than the predetermined temperature A shown in FIG. 9. Consequently, Tr'(Rr) is calculated as the same temperature as Tr(Rr), and TAO(Rr) is calculated based on this Tr'(Rr) (=Tr(Rr)). However, because the rear seat air temperature control unit 2 is stopped at this time, TAO(Rr) is calculated but the rear seat air temperature control unit 2 remains stopped.

Accordingly, when time T1 in FIG. 12 is exceeded, the deviation between Tr(Fr) and Tr(Rr) becomes the predetermined temperature A or more. At this time Tr'(Rr) is calculated as Tr(Fr) –B', as is understood also from FIG. 9, and TAO(Rr) is calculated based on this Tr'(Rr). At this time as well, however, TAO(Rr) is merely calculated.

Accordingly, when the rear seat air temperature control unit 2 is started while in this state, this rear seat air temperature control unit 2 heats the rear seat space, and so Tr(Rr) gradually rises, but until time T2 has occurred, the deviation between Tr(Fr) and Tr(Rr) is the predetermined temperature A or more, and so calculation Tr'(Rr)=Tr(Fr)–B' is calculated during this interval. Accordingly, the rear seat air temperature control unit 2 performs air temperature control for the rear seat space based on TAO(Rr) calculated based on this Tr'(Rr).

Accordingly, when time T1 is exceeded, the deviation between Tr(Fr) and Tr(Rr) becomes the predetermined temperature A or less, and so a calculation of Tr'(Rr)=Tr(Fr) is made. Accordingly, the rear seat air temperature control unit 2 performs air temperature control for the rear seat space based on this Tr'(Rr) (=Tr(Fr)).

The foregoing description of the operation was with regard to a time of heating the interior of the passenger compartment, but because Tr'(Rr) is calculated with the same way of thinking as when heating the passenger compartment and rear seat air temperature control unit 2 performs air temperature control for the rear seat space based on TAO(Rr) calculated based on this Tr'(Rr) also during cooling of the passenger-compartment interior, detailed description thereof will be omitted.

As was described above, when the deviation ΔTr between Tr(Fr) and Tr(Rr) is the predetermined temperature A or more, TAO(Rr) is calculated using Tr(Fr)+A' or Tr(Fr)–B' in substitution for Tr(Rr), and so TAO(Rr) can be calculated based on a temperature proximate to the actual mean temperature of the rear seat space, at least in comparison with a case where TAO(Rr) is calculated using Tr(Rr) without modification, and the first problem described with reference to FIG. 18 can be solved.

Additionally, when ΔTr is the foregoing predetermined temperature or less, TAO(Rr) is calculated based on TAO (Rr) which has already been caused to approach the actual mean temperature of the rear seat space, and so the above-described first problem can be solved.

As an incidental comment, when the first air temperature control unit 1 is started, thereafter Tr(Fr) gradually rises during heating of the passenger-compartment interior and gradually declines during cooling of the passenger-compartment interior, as shown in FIG. 12. Consequently, Tr(Fr) +A' or Tr(Fr)+B' also gradually rises during heating of the passenger-compartment interior and gradually declines during cooling of the passenger-compartment interior.

According to this embodiment, when ΔTr is a predetermined temperature or more, TAO(Rr) is calculated based on Tr(Fr)+A' or Tr(Fr)+B' which gradually rises or declines as was described above. Additionally, when ΔTr is a predetermined temperature or less, TAO(Rr) is calculated based on Tr(Fr) which gradually rises or declines.

According to this embodiment, TAO(Rr) is calculated based on a gradually rising or declining temperature in this way, and so the second problem described with reference to FIG. 19 can be solved.

Additionally, according to this embodiment, the term (|Tset(Fr)—Tset(Rr) |) representing the absolute value of the difference in the established temperatures was substituted into the terms A, A' B, and B', and so the larger this absolute value of the difference in the established temperatures becomes, the larger A, A', B, and B' become. When, for example, Tset(Fr)=32° C. and Tset(Rr)=18° C., A, A', B, and B' each become larger by an amount corresponding the difference thereof (=18° C.), yielding 24° C.

In this case, when the front seat air temperature control unit 1 alone is in operation until Tr(Fr) approaches Tset(Fr) =32° C., and thereafter the rear seat air temperature control unit 2 is operated, the rear seat air temperature control unit 2 heats the rear seat space and Tr(Rr) approaches Tset(Rr) (=18° C.).

Herein, because Tr(Fr)—B' in FIG. 9 is 8 (=32−24) ° C., when Tr(Rr) approaches Tset(Rr) (=18° C.) as was described above, Tr(Rr) becomes higher than Tr(Fr)—B'. Consequently, when Tr'(Rr) is calculated as Tr(Rr), the rear seat air temperature control unit 2 performs air temperature control for the rear seat space based on this temperature, and so the temperature of the rear seat space is controlled to become Tset(Rr).

A mode of operation and effect of this invention will be described herein while making comparison with a case where the above-mentioned predetermined temperature is taken to be constant irrespectively of the deviation.

Firstly, description will be made using as an example a case where the foregoing predetermined temperature is taken to be constant at 10° C. irrespectively of the deviation.

In a case where the first air temperature control target value is, for example, 32° C. and the second air temperature control target value is, for example, 18° C., when the first air temperature control unit is operated and the second air temperature control unit is stopped for a prolonged period, the temperature of the first air temperature control zone (substantially equal to the first detected temperature) stabilizes in the vicinity of 32° C.

When the outside air temperature is 5° C. at a time when the second air temperature control unit is started while in this state, the second detected temperature also becomes a temperature proximate to this outside air temperature, and so the deviation between the first detected temperature and the second detected temperature becomes the predetermined temperature (=10° C.) or more.

As a result thereof, the second target temperature is calculated using the temperature (=22° C.) separated from the first detected temperature by the predetermined temperature, and the second air temperature control unit is controlled based on this second detected temperature so that the temperature of the second air temperature control zone approaches the second air temperature control target value (=18° C.). Accordingly, the second detected temperature also approaches the second air temperature control target value in accompaniment thereto.

However, the air temperature control target value is lower than the temperature (=22° C.) separated from the first detected temperature by the predetermined value and the second detected temperature also changes to approach this temperature, and so the above-mentioned deviation between the several detected temperatures becomes the foregoing predetermined temperature regardless of how much time may elapse. Consequently, the second target temperature is calculated based on the temperature (=22° C.) separated from the first detected temperature by the predetermined temperature regardless of how much time may elapse, and the second air temperature control unit controls the temperature of the second air temperature control zone based on this temperature, and so the second air temperature control zone is air-conditioned more than is necessary.

In contrast thereto, according to this aspect of the present invention, the above-described predetermined temperature becomes proportionately larger as the foregoing deviation between the several air temperature control target values becomes larger. For example, in a case where the first air temperature control target value is 32° C. and the second air temperature control target value is 18° C. as was described above, the above-mentioned predetermined temperature is 24° C. in a case where the predetermined temperature has become larger by an amount corresponding to this difference in air temperature control target values. Accordingly, in this case, the temperature separated from the first detected temperature by the predetermined temperature is 8° C.

Consequently, because the second air temperature control target value (=18° C.) becomes higher than the foregoing temperature (=8° C.) separated from the first detected temperature by the predetermined temperature, problems such as were described above can be solved.

(Second Embodiment)

Figure 13:
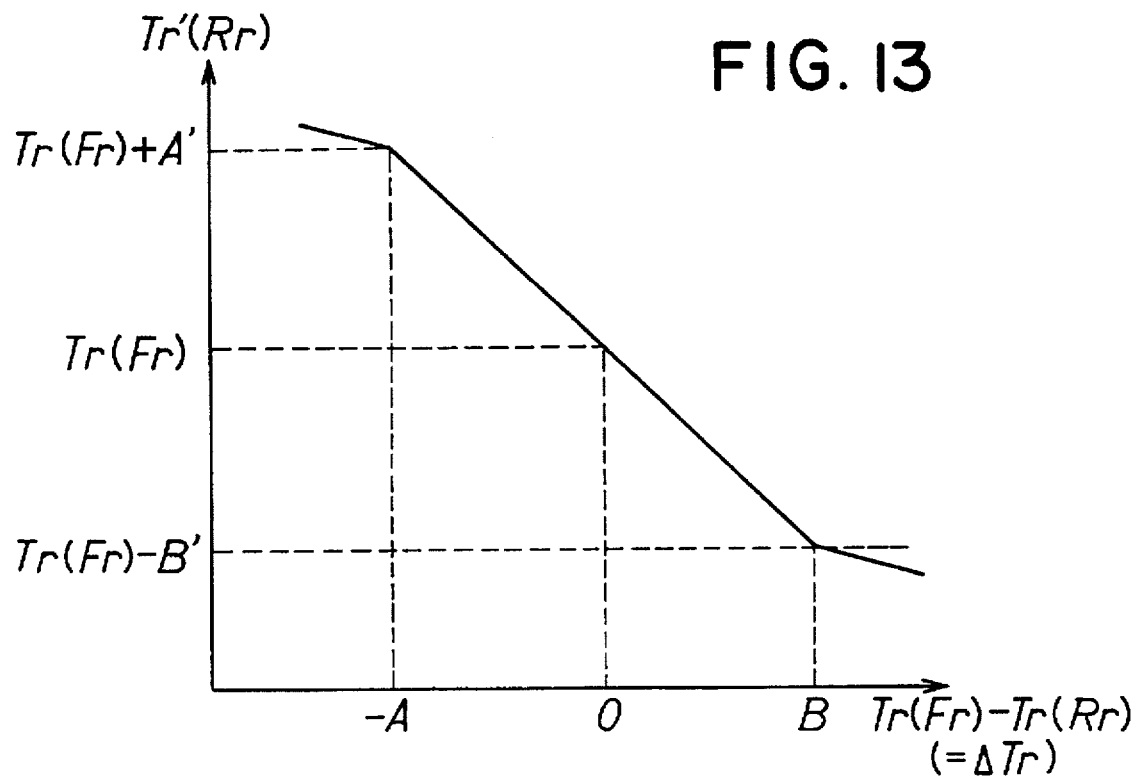
FIG. 13 is a graph showing rear seat inner air temperature Tr'(Rr) subsequent to compensation according to a second preferred embodiment of this invention.

The graph used in Step S82 (FIG. 8) of the first embodiment may be changed as shown in FIG. 13 in place of FIG. 9. That is, when the deviation ΔTr between Tr(Fr) and Tr(Rr) is a predetermined temperature (A or B) or more, Tr'(Rr) may be so as to become larger by a small quantity as this ΔTr increases.

(Third Embodiment)

Figure 14:
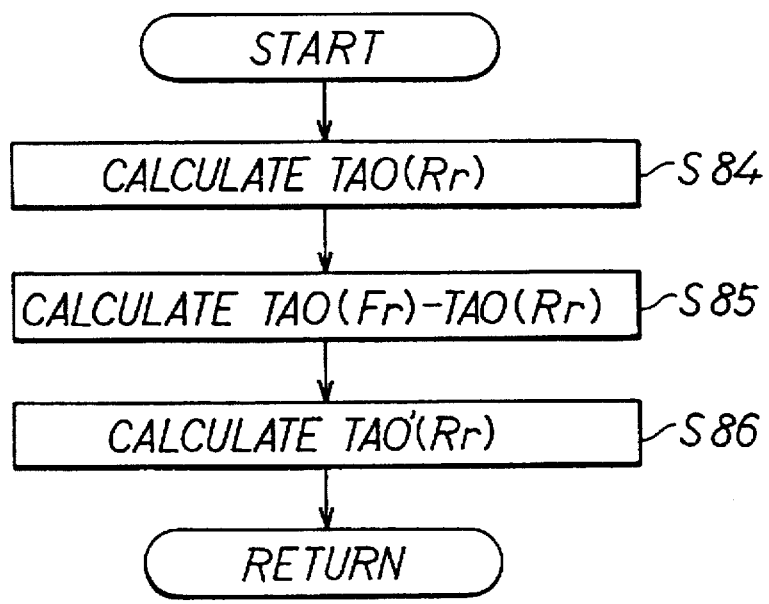
FIG. 14 is a flowchart showing details of Step S80 according to a third preferred embodiment of the present invention.

The subroutine shown in FIG. 14 may be called when execution is transferred to Step S80 (FIG. 4) of the first embodiment. This processing of this FIG. 14 will be described hereinafter.

In Step S84, rear seat target blowing temperature TAO (Rr) is calculated based on Equation 5 previously stored in ROM:

$$TAO(Rr)=Kset(Rr) \cdot Tset(Rr)-Kr(Rr) \cdot Tr(Rr)$$

$$-Kam(Rr) \cdot Tam-Ks(Rr) \cdot Ts+C(Rr) \text{ (° C.)} \tag{5}$$

In the subsequent Step S85, TAO(Fr)—TAO(Rr) (hereinafter termed "ΔTAO") is calculated.

Figure 15:
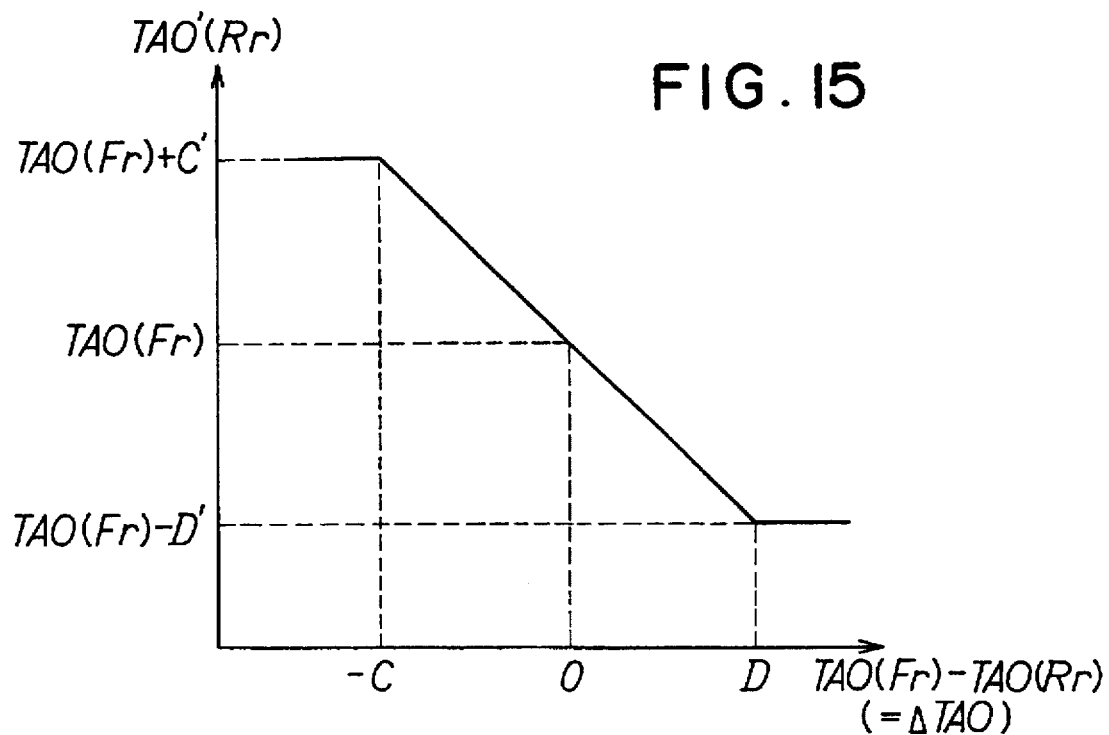
FIG. 15 is a graph showing rear seat target blowing temperature TAO'(Rr) subsequent to compensation according to the third embodiment.

In the subsequent Step S86, this rear seat target blowing temperature TAO(Rr) is compensated based on the deviation ΔTAO calculated in the foregoing Step S85 and the graph of FIG. 15 previously stored in ROM, and a new rear seat target blowing temperature TAO'(Rr) is calculated. Thereafter, this subroutine is exited.

In specific terms, when ΔTAO≦−C, calculation is performed so that TAO'(Rr)=TAO(Fr)+C'. When −C≦TAO≦D, calculation is performed so that TAO'(Rr) linearly becomes smaller as ΔTAO increases. When ΔTAO≧D, calculation is performed so that TAO'(Rr)=TAO(Fr)−D'.

That is, according to this embodiment, the predetermined temperature is caused to be C and D, and temperature separated from the first detected temperature by substantially the predetermined temperature is taken to be TAO(Fr)+C' and TAO(Fr)+D'.

Furthermore, C=γ+|Tset(Fr)−Tset(Rr)|, C'=γ'+ |Tset(Fr)−Tset(Rr)|, D=δ+|Tset(Fr)−Tset(Rr)|, and D'=δ'+|Tset(Fr)−Tset(Rr)|.

Additionally, when the discrepancy between the front seat mean temperature and the rear seat mean temperature becomes a maximum, the foregoing γ, γ', δ, and δ' each may be determined as a temperature at which the TAO calculated using this mean temperature may be believed likely to yield a discrepancy of this extent, as was described above with reference to FIG. 18, and according to this embodiment, are taken to be γ=γ'=δ=δ'=30° C.

According to this embodiment, as was described above, when the deviation ΔTAO between TAO(Fr) and TAO(Rr) is the predetermined temperature (C or D) or more, TAO'(Rr) is taken to be TAO(Fr)+C' or TAO(Fr)−D' and the rear seat air temperature control unit 2 is controlled based on this temperature, and so the rear seat air temperature control unit 2 can be controlled based on a TAO proximate to the TAO which originally would have been calculated, at least in comparison with a case where the second air temperature control unit 2 is controlled based on TAO(Rr), and the above-described first problem can be solved.

Additionally, when ΔTAO is the foregoing predetermined temperature or less, the rear seat air temperature control unit 2 is controlled based on a TAO(Rr) which has already been caused to approach the TAO(Rr) which originally would have been calculated, and so the above-described first problem can be solved.

When the first air temperature control unit 1 is started, thereafter the temperature of the front seat space gradually rises during heating of the passenger-compartment interior and gradually declines during cooling of the passenger compartment interior. Consequently, TAO(Fr) gradually declines during heating of the passenger-compartment interior and gradually rises during cooling of the passenger compartment interior. Accordingly, TAO(Fr)+C' or TAO(Fr)+D' also gradually declines during heating of the passenger-compartment interior and gradually rises during cooling of the passenger compartment interior.

According to this embodiment, when ΔTAO is the foregoing predetermined temperature or more, the rear seat air temperature control unit 2 is controlled based on TAO(Fr)+C' or TAO(Fr)+D' which gradually declines or rises as was described above. When ΔTAO is the foregoing predetermined temperature or less, the rear seat air temperature control unit 2 is controlled based on TAO(Fr) which gradually declines or rises.

According to this embodiment, the rear seat air temperature control unit 2 is controlled based on a gradually declining or rising temperature in this way, and so the second problem described with reference to FIG. 19 can be solved.

(Fourth Embodiment)

Figure 16:
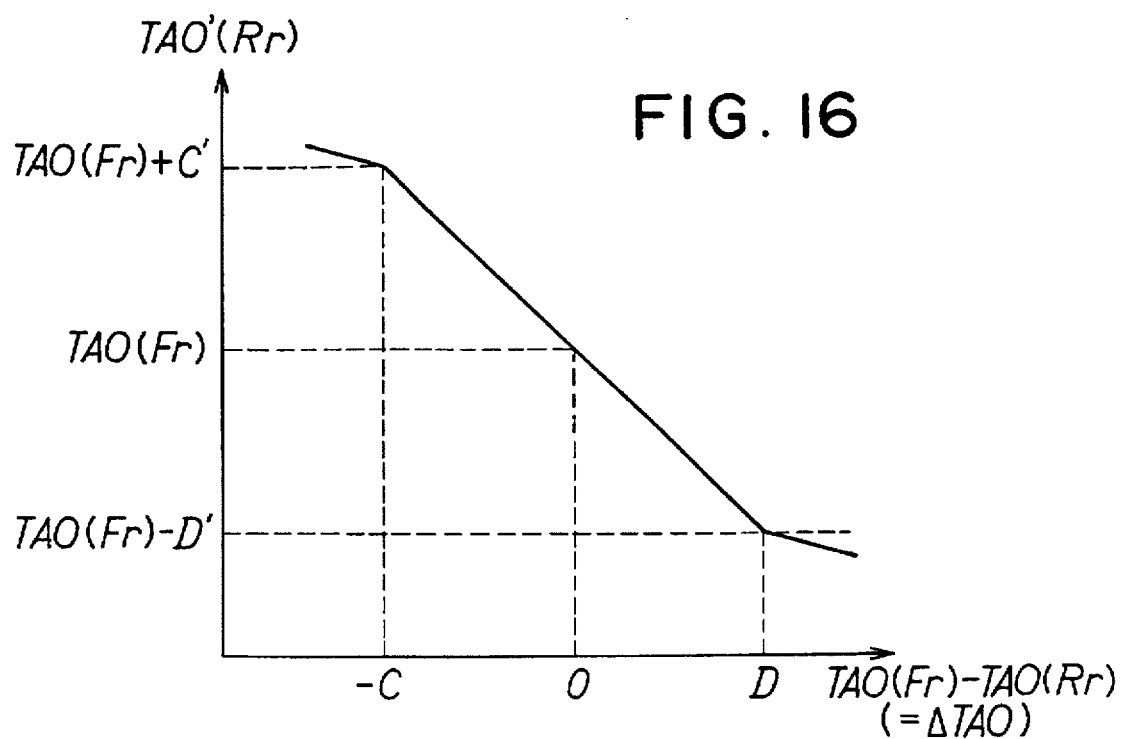
FIG. 16 is a graph showing rear seat target blowing temperature TAO'(Rr) subsequent to compensation according to a fourth preferred embodiment of the present invention.

The graph used in Step S86 (FIG. 8) of the third embodiment may be changed as shown in FIG. 16 in place of FIG. 15. The basic thinking with respect to changing the map in this way is similar to the second embodiment.

(Fifth Embodiment)

Figure 17:
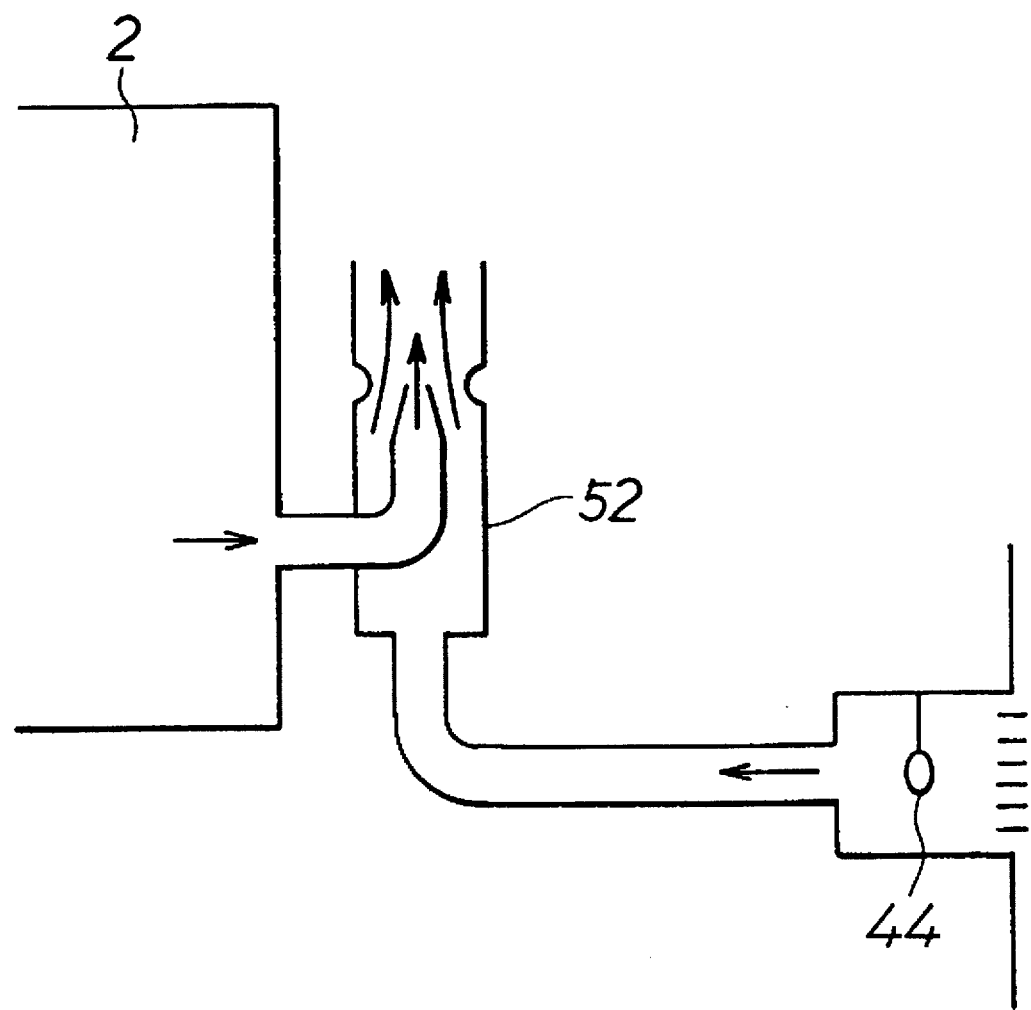
FIG. 17 shows a portion of the structure according to a fifth preferred embodiment of the present invention.

The structure indicated in FIG. 17 may be employed as a structure such that an air current of the rear seat space strikes the rear seat inner air temperature sensor 44 in conjunction with operation of the rear seat air temperature control unit 2.

According to this, when the rear seat air temperature control unit 2 is operating, a vacuum is generated in an aspirator 52, and due thereto the air current favorably reaches rear seat inner air temperature sensor 44. When the rear seat air temperature control unit 2 is stopped, no vacuum is generated in the aspirator 52, and so no air current strikes the rear seat inner air temperature sensor 44.

The several problems of the prior art can be solved by performing control similarly to the above-described several embodiments even in a case of structure such as this.

(Other Embodiments)

According to the above-described first and second embodiments, α, α', β, and β' in FIG. 9 and FIG. 13 were respectively set to α=α' and β=β' to yield A=A' and B=B', but these may be set to A<>A' and B<>B'. In this case, when −A≦ΔTr≦B, Tr'(Rr) does not become Tr(Rr), but becomes substantially Tr(Rr).

According to the above-described third and fourth embodiments, γ, γ', δ, and δ' in FIG. 15 and FIG. 16 were respectively set to γ=γ' and δ=δ' to yield C=C' and D=D', but these may be set to C<>C' and D<>D'. In this case, when −C≦ΔTAO≦D, TAO'(Rr) does not become TAO(Rr), but becomes substantially Tr(Rr).

Additionally, according to the foregoing several embodiments, the first target temperature was set to TAO(Fr) and the second target temperature was set to TAO(Rr), but the first target temperature may be set to Tset(Fr)−Tr(Fr) and the second target temperature may be set to Tset(Rr)−Tr(Rr).

Additionally, the foregoing several embodiments were such that Tr'(Rr) or TAO(Rr) was calculated even while the rear seat air temperature control unit 2 was stopped, but this calculation may be performed after the rear seat air temperature control unit 2 has commenced operation.

When the front seat inner air temperature sensor 43 is disposed in a location where an air current of the rear seat space strikes the rear seat inner air temperature sensor 44 in conjunction with operation of the rear seat air temperature control unit 2 as in the foregoing several embodiments, the first air temperature control zone, the first inner air temperature-detecting device, and the first air temperature control unit may respectively be the rear seat space, the rear seat inner air temperature sensor 44, and the rear seat air temperature control unit 2, and the second air temperature control zone, the second inner air temperature-detecting device, and the second air temperature control unit may respectively be the front seat space, the front seat inner air temperature sensor 43, and the front seat air temperature control unit 1.

According to the foregoing several embodiments, an apparatus for independently controlling the air temperature of front and rear seat areas was described, but the invention can also be applied to an apparatus for independently controlling the air temperature of left-hand and right-hand seat areas, and can be applied in another apparatus for independently air temperature control a plurality of air temperature control zones.

According to the foregoing several embodiments, the first and second air temperature control target-establishing devices were the front seat temperature setting device 50 and the rear seat temperature setting device 51, but these may be a temperature-sensation input switch to instruct raising or lowering of the blown-air temperature in accordance with a temperature personally felt by a rider in the respective front or rear seat.

According to the foregoing several embodiments, an example was described where air temperature control units 1 and 2 which are able to both heat and cool were installed on the front seat side and on the rear seat side, but the invention can be applied also in an example where an air conditioner unit which solely cools and a heater unit which solely heats are installed on the front seat side, or on the rear seat, or on both sides.

According to the foregoing several embodiments, the term (|Tset(Fr)−Tset(Rr)|) representing the absolute value of the difference in the established temperatures was substituted into A, A', B, and B' in FIG. 9 and FIG. 13 and C, C', D, and D' in FIG. 15 and FIG. 16, but this item may be multiplied by a predetermined constant, or conversely this item may be eliminated.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An air temperature control apparatus for vehicle use, said apparatus comprising:

first temperature detecting means for detecting an inner air temperature of a first air temperature control zone within a passenger compartment;

a first air temperature control unit for blowing conditioned air toward said first air temperature control zone;

second temperature detecting means for detecting an inner air temperature of a second air temperature control zone within the passenger compartment;

a second air temperature control unit for blowing conditioned air toward said second air temperature control zone;

wherein said second temperature detecting means is provided at a location where an air current of said second air temperature control zone strikes in conjunction with operation of said second air temperature control unit; and said first air temperature control unit is for operating responsive to a first target temperature calculated using a first detected temperature detected by said first temperature detecting means;

said second air temperature control unit is for operating based on a second target temperature calculated using a second detected temperature detected by said second temperature detecting means; and when, subsequent to having been switched from a state where said first air temperature control unit is operating and said second air temperature control unit is not operating to a state where said second air temperature control unit also is operating, a deviation between said first detected temperature and said second detected temperature is a predetermined temperature or more, said second target temperature is calculated using a temperature separated by substantially said predetermined temperature from said first detected temperature in place of said second detected temperature, and when said deviation is said predetermined temperature or less, said second target temperature is calculated using substantially said second detected temperature.

2. The apparatus of claim 1, further comprising:

first establishing means for establishing a first air temperature control target value for said first air temperature control zone; and second establishing means for establishing a second air temperature control target value for said second air temperature control zone;

said predetermined temperature becomes proportionately larger as a deviation between said first air temperature control target value and said second air temperature control target value becomes larger.

3. The apparatus of claim 2, wherein:

said first air temperature control zone is a space on a front seat side within a passenger compartment of a vehicle; and said second air temperature control zone is a space on a rear seat side within said passenger compartment.

4. The apparatus of claim 1, wherein:

said first air temperature control zone is a space on a front seat side within a passenger compartment of a vehicle; and said second air temperature control zone is a space on a rear seat side within said passenger compartment.

5. The apparatus of claim 1, wherein said location where an air current of said second air temperature control zone strikes in conjunction with operation of said second air temperature control unit is proximate to an inner air intake port of said apparatus.

6. An air temperature control apparatus for vehicle use, said apparatus comprising:

first temperature detecting means for detecting inner air temperature of a first air temperature control zone within a passenger compartment;

a first air temperature control unit for blowing conditioned air toward said first air temperature control zone;

second temperature detecting means for detecting an inner air temperature of a second air temperature control zone within the passenger compartment; and a second air temperature control unit for blowing conditioned air toward said second air temperature control zone;

wherein said second temperature detecting means is provided at a location whereat an air current of said second air temperature control zone strikes in conjunction with operation of said second air temperature control unit;

said first air temperature control unit is for operating based on a first target temperature calculated using a first detected temperature detected by said first temperature detecting means;

said second air temperature control unit is for operating based on a second target temperature calculated using a second detected temperature detected by said second temperature detecting means; and when, subsequent to having been switched from a state wherein said first air temperature control unit is operating and said second air temperature control unit is not operating to a state where said second air temperature control unit also is operating, a deviation between said first target temperature and said second target temperature is a predetermined temperature or more, said second target temperature is considered to be a temperature separated by substantially said predetermined temperature from said first target temperature, and when said deviation is said predetermined temperature or less, said second target temperature is considered to be substantially said second target temperature.

7. The apparatus of claim 6, further comprising:

first establishing means for establishing a first air temperature control target value for said first air temperature control zone; and second establishing means for establishing a second air temperature control target value for said second air temperature control zone;

said predetermined temperature becomes proportionately larger as a deviation between said first air temperature control target value and said second air temperature control target value becomes larger.

8. The apparatus of claim 7, wherein:

said first air temperature control zone is a space on a front seat side within a passenger compartment of a vehicle; and said second air temperature control zone is a space on a rear seat side within said passenger compartment.

9. The apparatus of claim 6, wherein:

said first air temperature control zone is a space on a front seat side within a passenger compartment of a vehicle; and said second air temperature control zone is a space on a rear seat side within said passenger compartment.

10. The apparatus of claim 6, wherein said location where an air current of said second air temperature control zone strikes in conjunction with operation of said second air temperature control unit is proximate to an inner air intake port of said apparatus.

* * * * *